United States Patent [19]
Jessani et al.

[11] Patent Number: 5,787,479
[45] Date of Patent: Jul. 28, 1998

[54] METHOD AND SYSTEM FOR PREVENTING INFORMATION CORRUPTION IN A CACHE MEMORY CAUSED BY AN OCCURRENCE OF A BUS ERROR DURING A LINEFILL OPERATION

[75] Inventors: Romesh Mangho Jessani; Belliappa Manavattira Kuttanna; Soummya Mallick; Rajesh Bhikhubhai Patel, all of Austin, Tex.

[73] Assignees: International Business Machines Corporation, Armonk, N.Y.; Motorola, Inc., Schaumburg, Ill.

[21] Appl. No.: 639,576

[22] Filed: Apr. 29, 1996

[51] Int. Cl.$^6$ .................................................. G06F 12/16
[52] U.S. Cl. ............................. 711/144; 395/185.07
[58] Field of Search .......................... 711/125, 128, 711/133, 144, 145, 166, 167; 365/49; 395/185.07, 185.09

[56] References Cited

U.S. PATENT DOCUMENTS

5,091,850  2/1992  Culley .................................. 711/3
5,124,568  6/1992  Chen et al. ......................... 327/217

*Primary Examiner*—Eddie P. Chan
*Assistant Examiner*—Hiep T. Nguyen
*Attorney, Agent, or Firm*—Casimer K. Salys; Antony P. Ng; Andrew J. Dillon

[57] ABSTRACT

A method and system for preventing information corruption in a cache memory due to a bus error which occurs during a cache linefill operation is disclosed. The cache memory includes multiple cache lines, and a tag is associated with each cache line. In accordance with the present disclosure, a tag associated with a cache line is validated before a linefill operation is performed on the cache line. In response to an occurrence of a bus error during the linefill operation, the tag associated with the cache line for which a linefill operation is performed, is invalidated such that the information within the cache line remains valid during a linefill operation unless a bus error occurs.

11 Claims, 6 Drawing Sheets

METHOD AND SYSTEM FOR PREVENTING INFORMATION CORRUPTION IN A CACHE MEMORY CAUSED BY AN OCCURRENCE OF A BUS ERROR DURING A LINEFILL OPERATION

BACKGROUND

1. Technical Field

The present disclosure relates to a method for improving data processing in general and, in particular, to a method for preventing data corruption in a cache memory within a data processing system. Still more particularly, the present disclosure relates to a method for preventing data corruption in a cache memory caused by a bus error which occurs during a cache memory linefill operation within a high-performance data processing system.

2. Description of the Related Art

A high-performance data processing system typically includes both a system memory and a cache memory. A cache memory is a small memory having almost the equivalent speed of a processor, interposed between the processor and the system memory. The cache memory serves as a transparent bridge between the processor and the system memory. The cache memory is transparent in the sense that it is invisible to a user (to cache means to hide), and hence, it is also not directly addressable by the user. However, by providing the processor with all of the current information the processor requires at a faster speed, the cache memory creates an illusion of having a larger system memory operating at the speed of the processor.

The cache memory can be configured as an instruction cache for storing instructions or a data cache for storing data, and most high-performance data processing systems have both an instruction cache and a data cache. But, regardless of whether the cache memory is an instruction cache or a data cache, only a portion of the information within the system memory is copied into the cache memory, and consequently, a cache "miss" can occur when the instruction or data requested by the processor cannot be found in the respective cache memory. In that case, a cache memory linefill operation must be performed.

When a bus error condition arises in the middle of a cache memory linefill operation, the linefill operation is typically aborted and the processor enters into a Machine Check Interrupt routine. A bus error amounts to any error that occurs on the address or data bus during a bus tenure. Obviously, if the linefill operation is performed on an invalid cache line within the cache memory, then there is no concern of corruption to the information in the cache line. However, if the linefill operation is performed on a valid cache line, then an occurrence of a bus error will corrupt the information that is already present within the valid cache line. This problem is even more severe if the cache line that is undergoing a linefill operation contains the location of the Machine Check Interrupt routine, because the corrupted cache line will in turn corrupt the Machine Check Interrupt routine that is to be executed immediately after the bus error.

Figure 6A:
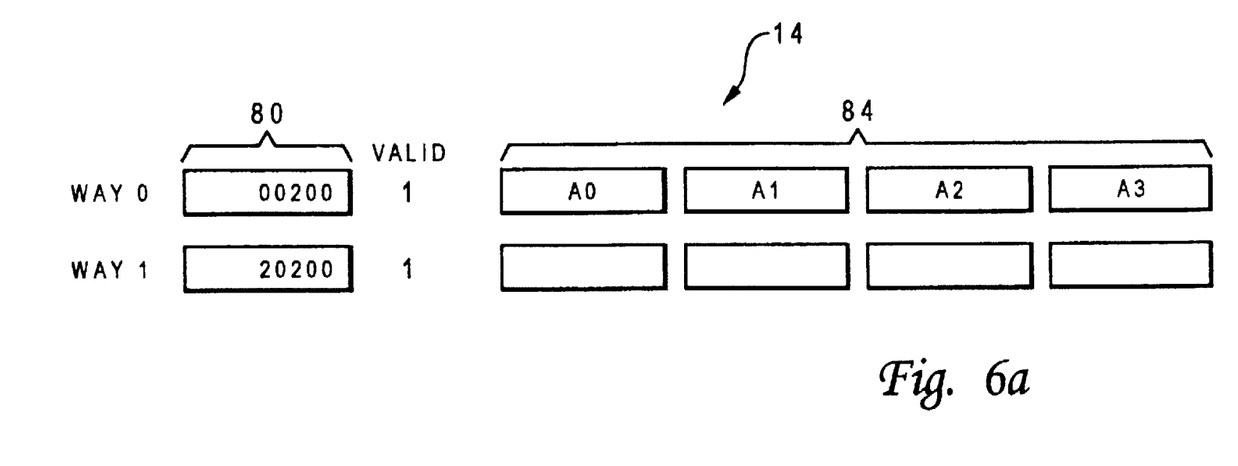
FIGS. 6a and 6b illustrate an example of a cache line corruption due to a bus error occurrence during the linefill operation.
Figure 6B:
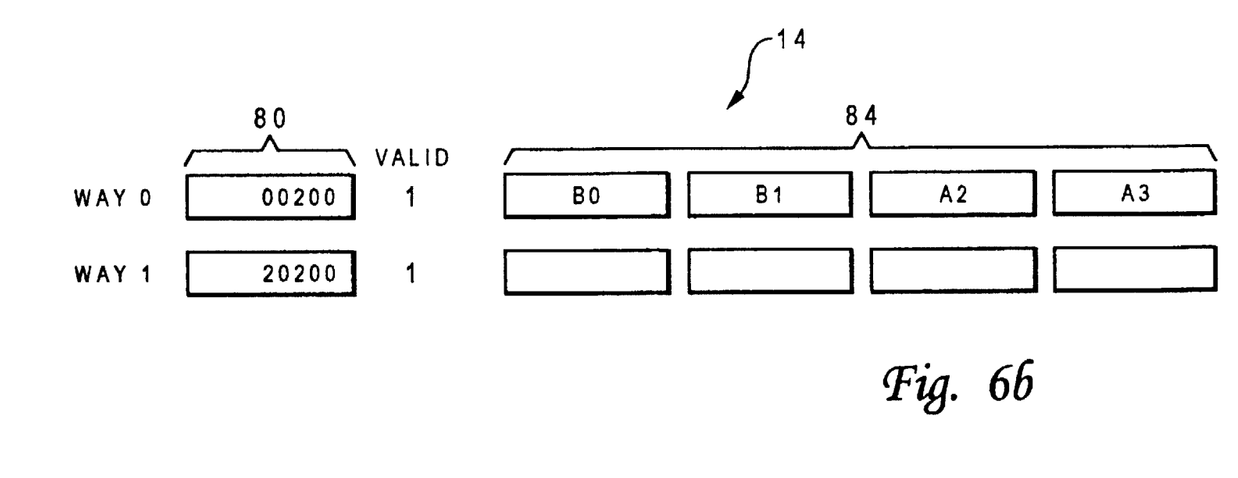

Referring now to FIGS. 6a and 6b, there are illustrated an example of a cache line corruption due to a bus error occurrence during the linefill operation. FIG. 6a shows a two-way instruction cache 14 having address tag 80 and instruction block 84. As shown, both two ways of instruction cache 14 are valid. Instruction block 84 of way 0 contains instructions A0, A1, A2 and A3, which corresponds to tag "00200" stored in address tag 80. At this point, if there is an instruction fetch to address "ABCD0200," for instance, then way 0 will be replaced (assuming way 0 is the next cache line to be replaced according to the replacement scheme in place). FIG. 6b shows an occurrence of a bus error during the of instructions A0, A1, A2 and A3 by B0, B1, B2 and B3. The bus error occurs after the second beat of the linefill operation (a beat is a single data transfer equal to the width of a data bus), thus the linefill for address "ABCD0200" is aborted at this point due to the bus error. However, because way 0 is still valid when the bus error occurred, way 0 is corrupted with instructions B0 and B1.

One possible solution to this problem is to invalidate the cache line at the beginning of the linefill operation and then validate the cache line only after the last beat of the linefill operation. In this manner, if a bus error interrupts the linefill operation, any corrupted information is prevented from being presented to the processor, because the cache line is in an invalid state. However, a drawback of this solution is that the tag for the respective cache line must always be enabled for the first three beats of every linefill operation in order to invalidate that cache line, and the enabling of the tags consumes a significant amount of power. Further, this solution is not applicable to a non-blocking cache arrangement because the cache line in such an arrangement is invalid throughout the entire linefill operation. Consequently, it would be desirable to provide a better method for preventing information corruption in a cache line caused by a bus error which occurs during a linefill operation.

SUMMARY

It is therefore an object of the present disclosure to provide an improved method and system for data processing.

It is another object of the present disclosure to provide an improved method and system for preventing information corruption in a cache memory within a data processing system.

It is yet another object of the present disclosure to provide an improved method and system for preventing information corruption in a cache memory caused by a bus error during a cache memory linefill operation within a high-performance data processing system.

A method and system for preventing information corruption in a cache memory which occurs due to a bus error during a cache linefill operation is disclosed. The cache memory includes multiple cache lines, and a tag is associated with each cache line. In accordance with the present disclosure, a tag associated with a cache line is validated before a linefill operation is performed on the cache line. In response to an occurrence of a bus error during the linefill operation, the tag associated with the cache line for which a linefill operation is performed, is invalidated such that the information within the cache line remains valid during a linefill operation unless a bus error occurs.

All objects, features, and advantages of the present disclosure will become apparent in the following detailed written description.

DESCRIPTION OF THE DRAWINGS

The disclosure itself, as well as an illustrative mode of use, further objects, and advantages thereof, will best be understood by reference to the following detailed description of an illustrative disclosure when read in conjunction with the accompanying drawings, wherein.

DETAILED DESCRIPTION OF AN ILLUSTRATIVE EMBODIMENT

An illustrative embodiment under the present disclosure may be implemented on a variety of processors and cache-based data processing system. For the purpose of illustration, an illustrative embodiment as described below is implemented on one of the PowerPC™ line of microprocessors manufactured by International Business Machines Corporation, which operates according to reduced instruction set computing (RISC) techniques.

Figure 1:
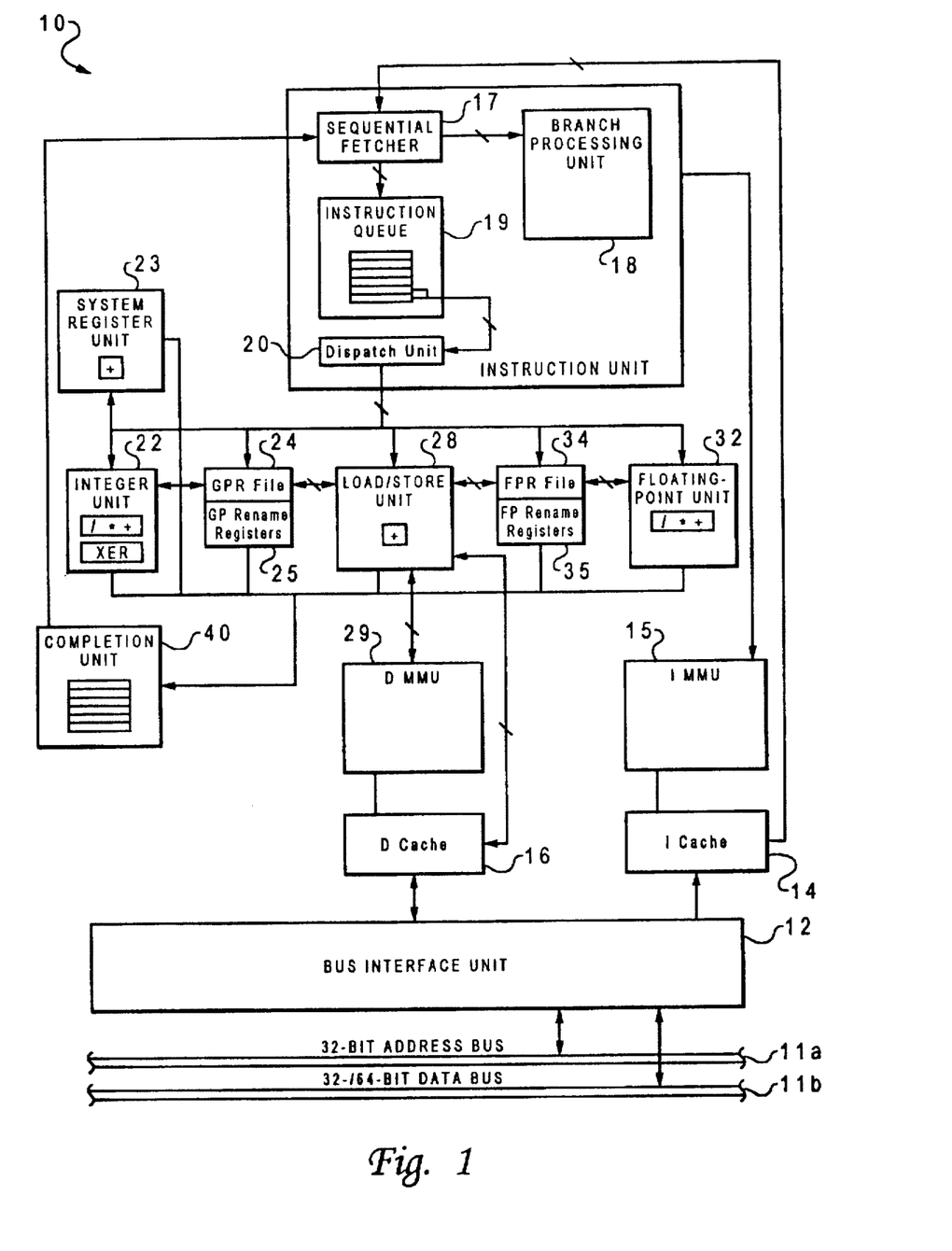
FIG. 1 is a block diagram of an illustrative embodiment of a processor which utilizes the method of the present disclosure.

Referring now to FIG. 1, there is illustrated a block diagram of a processor 10 for data processing. In an illustrative embodiment of the present disclosure, processor 10 is a single integrated circuit superscalar microprocessor, comprising various registers, buffers, execution units, and functional units. As depicted in FIG. 1, processor 10 is coupled to address bus 11a and data bus 11b via a bus interface unit (BIU) 12 within processor 10. BIU 12 controls the transfer of information between processor 10 and other devices, such as a system memory (not shown), that are coupled to address bus 11a and data bus 11b. Processor 10, address bus 11a, data bus 11b and the other devices coupled to buses 11a, 11b together form a host data processing system.

Within processor 10, BIU 12 is connected to an instruction cache 14 and a data cache 16 in which an illustrative embodiment of the present disclosure may be incorporated. Both instruction cache 14 and data cache 16 are high-speed caches which allow processor 10 to access a subset of instructions or data previously transferred from the system memory in a relatively short amount of time, thus improving the total speed of operation of the host data processing system. Instruction cache 14 and data cache 16 are coupled to instruction memory management unit (MMU) 15 and data MMU 29 respectively. Instruction cache 14 is further coupled to sequential fetcher 17 which fetches instructions from instruction cache 14 during each execution cycle. Sequential fetcher 17 transmits branch instructions fetched from instruction cache 14 to branch processing unit (BPU) 18 for execution, but temporarily stores sequential instructions within instruction queue 19 for later execution by other execution circuitry within processor 10.

In addition to BPU 18, the other execution circuitry of processor 10 includes three execution units, namely, integer unit (IU) 22, load/store unit (LSU) 28, and floating-point unit (FPU) 32. Each of these three execution units may execute one or more classes of instructions, and all execution units operate concurrently during each processor cycle. IU 22 executes all integer instructions, and performs mathematical operations by utilizing an arithmetic logic unit, a multiplier, a divider, and an integer exception register (XER). General purpose registers (GPR) 24 and GPR rename registers 25 are provided to support integer operations. Conversely, FPU 32 performs floating-point operations, such as floating-point addition, multiplication and division, on source operands received from floating-point registers (FPR) 34 or FPR rename registers 35. As its name implies, LSU 28 executes all load and store instructions and acts as a data transfer interface between GPRs 24, FPRs 34, and data cache 16. LSU 28 calculates effective address, performs data alignment, and provides sequencing for load/store string and multiple instructions. Further, system register unit 23 executes various system-level instructions, including conditions register logical operations and integer add/compare instructions.

Processor 10 employs both pipelining and out-of-order execution of instructions to further improve the performance of its superscalar architecture. Accordingly, instructions can be executed by IU 22, LSU 28, and FPU 32 in any order as long as data dependencies are observed.

Figure 2:
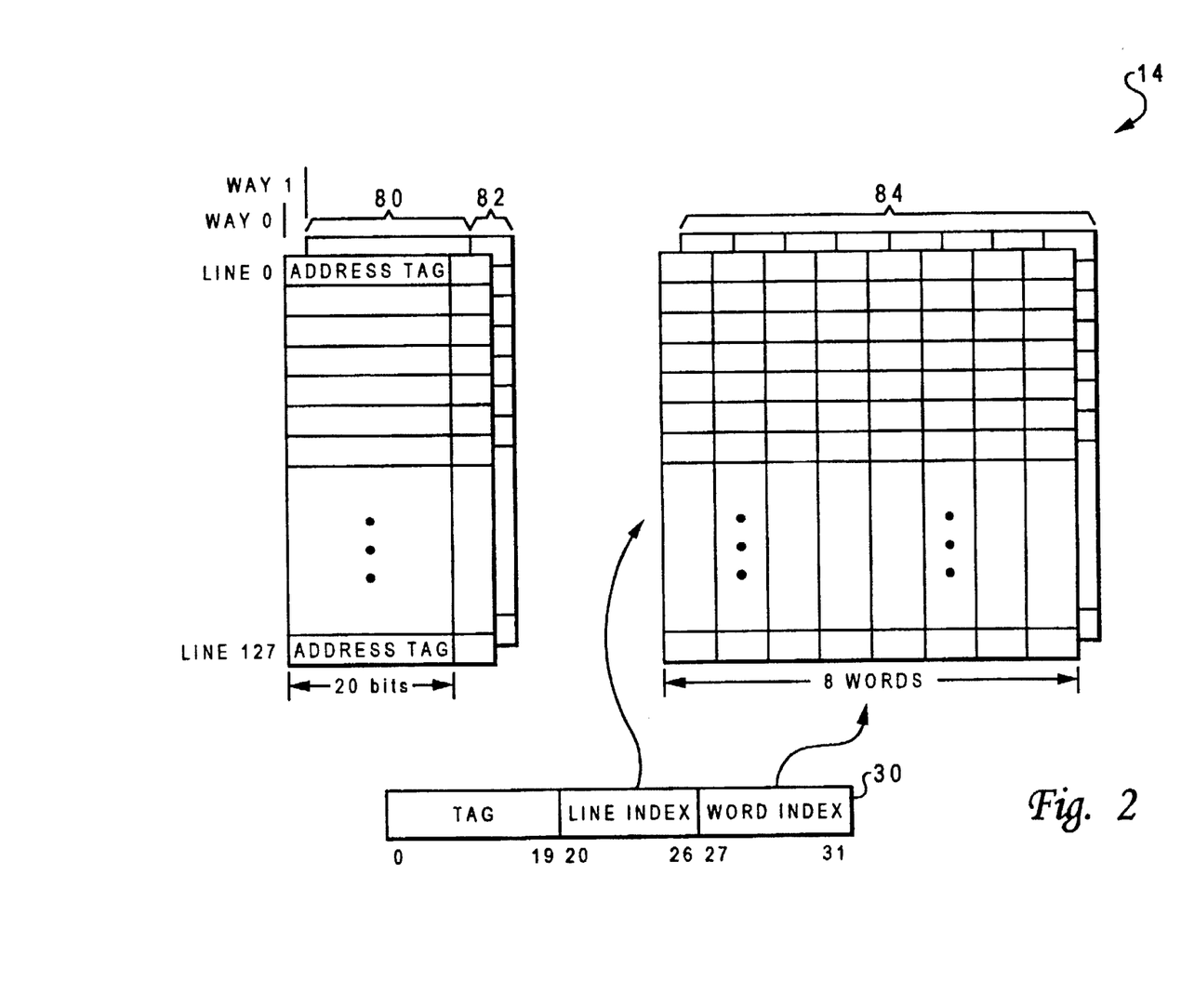
FIG. 2 is a block diagram of an instruction cache memory within the processor of FIG. 1, according to an illustrative embodiment of the present disclosure.

With reference now to FIG. 2, there is depicted a block diagram of the organization of an 8-Kbyte instruction cache 14 according to an illustrative embodiment of the disclosure. Instruction cache 14 is configured as a two-way cache—way 0 and way 1, with each way having 128 cache lines, from line 0 to line 127. Each cache line comprises an address tag 80, one valid bit 82, and instruction block 84. Instruction block 84 is 32 bytes (or 8 words) wide while address tag 80 is only 20 bits wide.

Each cache line is indexed by bits 20-26 of an address 30, and each byte within the cache line is indexed by bits 27-31 of address 30. In addition, address tag 80 within each cache line contains an address tag that is utilized for comparison with bits 0-19 of address 30 in order to determine whether there is a cache "hit" or "miss." Incidentally, a match between address tag 80 in one of ways 0 or 1 and bits 0-19 of address 30 means a cache "hit." Further, valid bit 82 is for indicating whether that particular cache line is valid or not. Typically, a "1" means the instruction in the cache line is valid while a "0" means the instruction in the cache line is not valid, though a reverse assignment is also acceptable.

Figure 3:
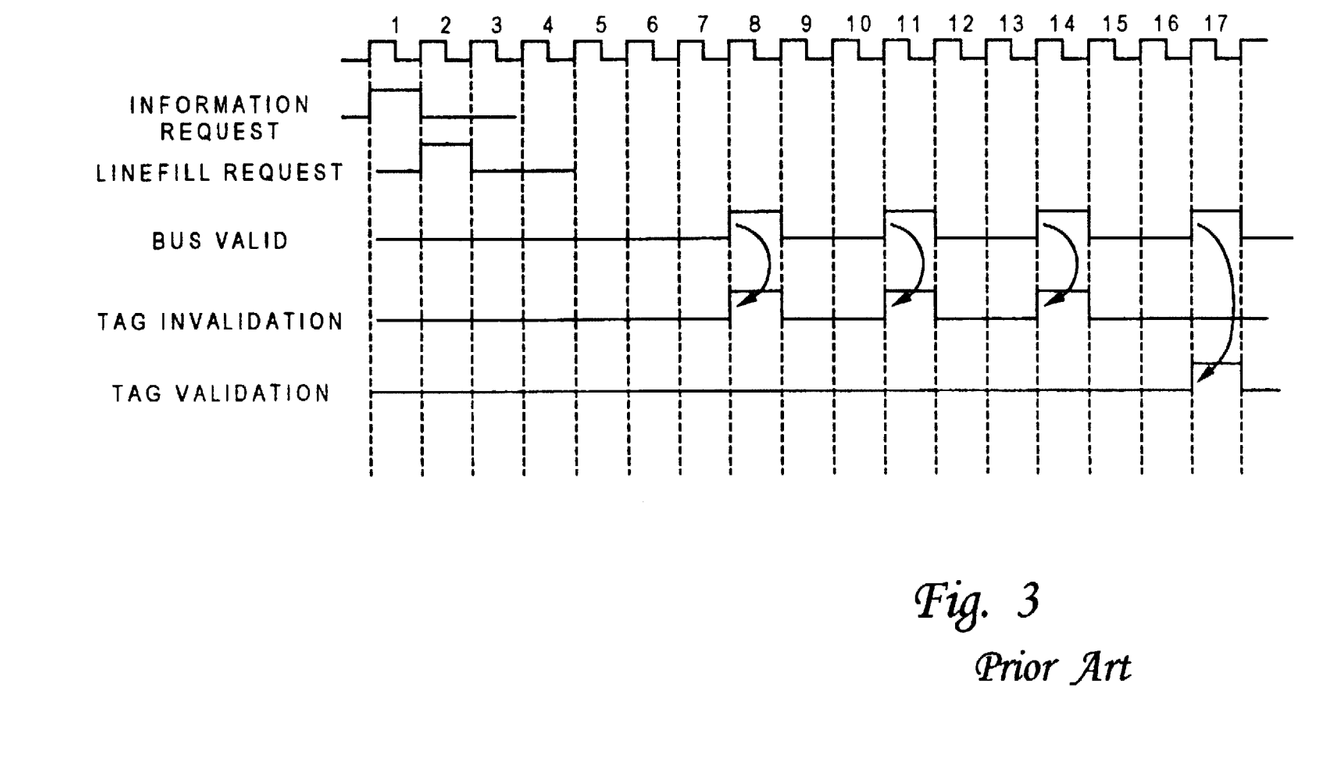
FIG. 3 is a timing diagram of a linefill operation for an instruction cache according to prior art.

Referring now to FIG. 3, there is illustrated a timing diagram of the linefill operation for instruction cache 14, under prior art. In cycle 1, the instruction unit makes a request to instruction cache 14 for an instruction. When the requested instruction is not in instruction cache 14, a linefill request for the requested instruction from the system memory is made in cycle 2. The information (i.e., data or instruction) for a linefill operation is typically available in several beats, known as a burst. In this illustration, the information for the linefill operation is available in four beats. As shown, the information which contains the requested instruction becomes valid on data bus 11b in cycle 8, though the information may be available at any cycle after the linefill request is made in cycle 2. The exact cycle in which the information becomes available depends on the activities on data bus 11b. In the same cycle 8, when the requested information (the critical information) is available for the linefill operation, the tag for the cache line in which a linefill operation will be performed is invalidated such that the status of that particular cache line is "invalid." When the second beat of information associated with the requested information is available in cycle 11, the tag for that cache line is invalidated again. The tag invalidation procedure is required once again in cycle 14 when the third beat of information becomes available in that cycle. Finally, when the last beat of the information becomes available in cycle 17, the tag for that cache line is validated such that the status of the cache line is "valid" and a new tag is written to the corresponding way in address tag 80.

As mentioned previously, this scheme of repeating tag invalidation under prior art requires the enabling of the tag several times, which consumes a huge amount of power. Further, this scheme is disadvantageous to a non-blocking cache arrangement because the cache line is "invalid" throughout the entire linefill operation, making it impossible for the cache line to be "hit."

Figure 4:
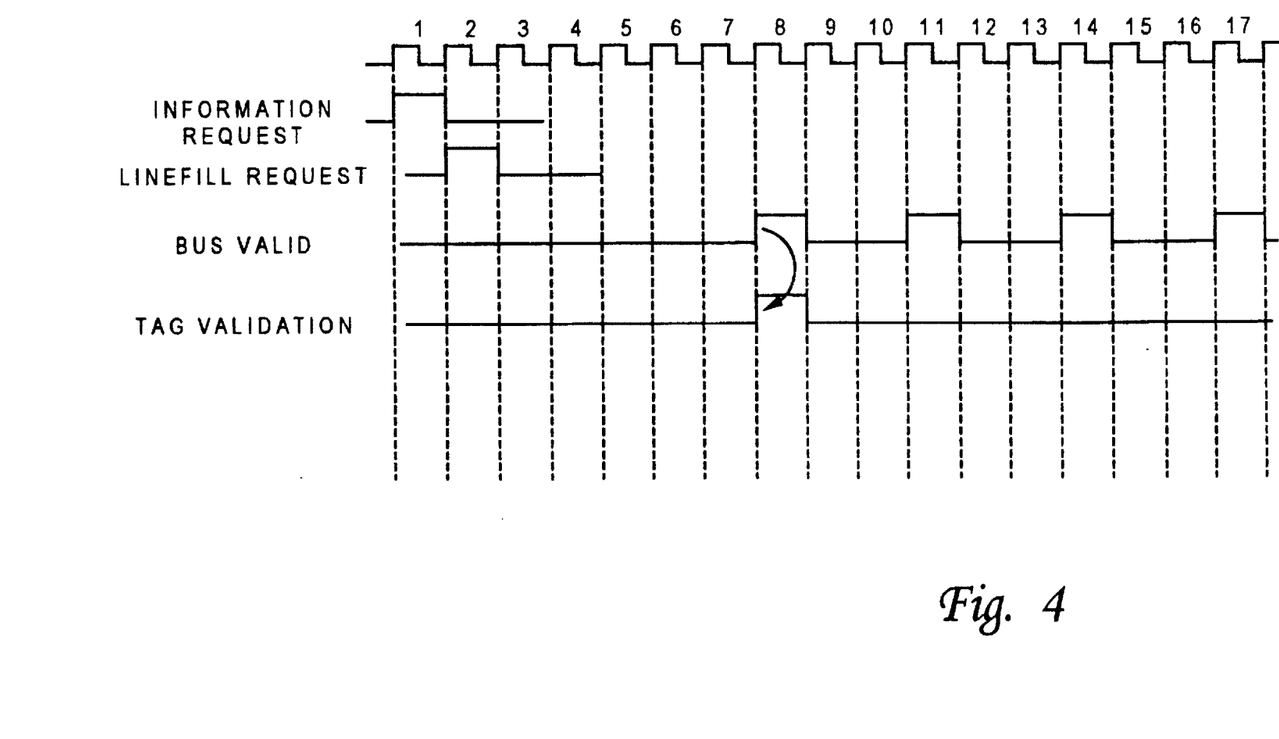
FIG. 4 is a timing diagram of a linefill operation for an instruction cache according to an illustrative embodiment of the present disclosure.

With reference now to FIG. 4, there is illustrated a timing diagram of the linefill operation for an instruction cache, utilizing the method in accordance with an illustrative embodiment of the disclosure. In cycle 1, the processor makes a request to instruction cache 14 for an instruction. When the requested instruction is not in instruction cache 14, a linefill request for the instruction from the system memory is made in cycle 2. In this illustration, the information for the linefill operation is available in four beats. As shown, the information which contains the requested instruction becomes valid on data bus 11b in cycle 8, though the information may be available at any cycle after the linefill request is made in cycle 2. In the same cycle 8 when the requested information (the critical information) becomes available for the linefill operation, the tag for the cache line in which a linefill operation will be performed is validated such that the status of that particular cache line is "valid." For the purpose of this disclosure, the critical information is the first information to be written to a cache line of instruction cache 14 before the rest of the information. When the second beat of information associated with the requested information is available in cycle 11, the status of the cache line is not changed. Again, the status of the cache line is not changed when the third beat of information is available in cycle 14. Finally, when the last beat of the information is available in cycle 17, changes to the tag for that cache line is not required because the status of the cache line is already "valid."

Figure 5:
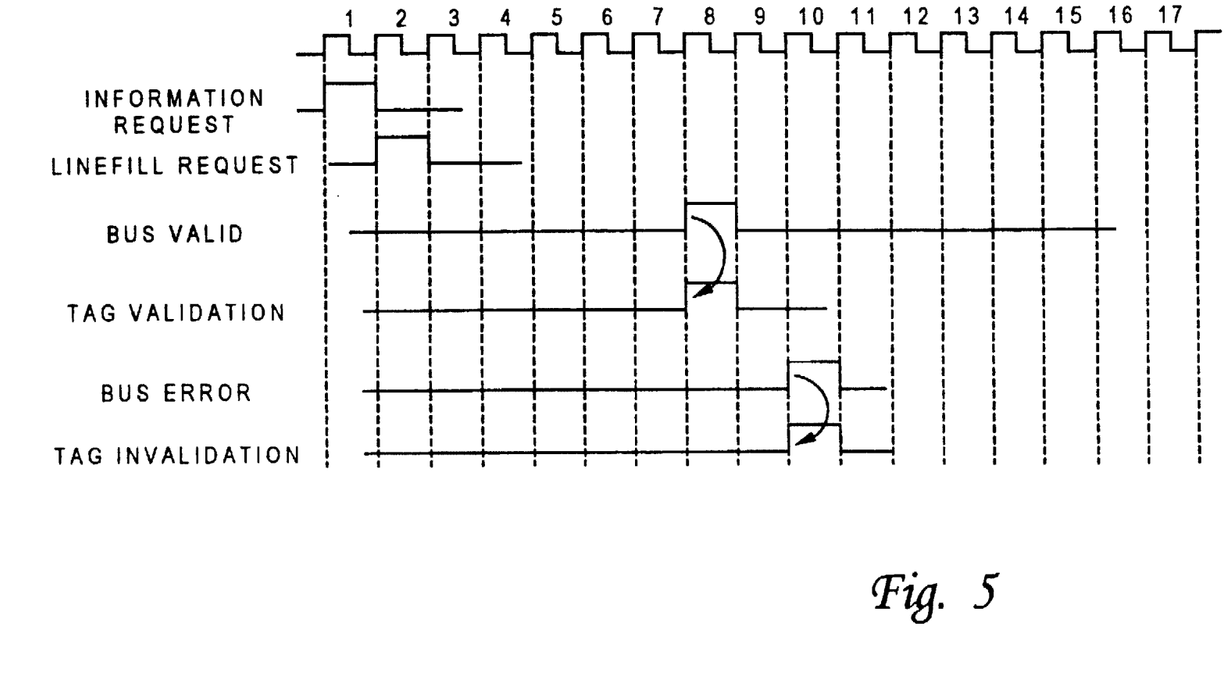
FIG. 5 is a timing diagram of a linefill operation during which a bus error occurs, in accordance with an illustrative embodiment of the present disclosure.

Referring now to FIG. 5, there is illustrated a timing diagram of the linefill operation during which a bus error occurs, in accordance with an illustrative embodiment of the present disclosure. Similar to FIG. 4, the information for the linefill operation becomes available in cycle 8. But before the second beat of information becomes available, a bus error occurs in cycle 10. At this point in cycle 10, according to an illustrative embodiment of the present disclosure, the tag for the cache line on which the linefill operation is performing is immediately invalidated. Hence, the information in that cache line is considered as "invalid" such that any access to the information within that cache line is prohibited. This prevents the corrupted information within the cache line from being accessed.

Not only the method of cache line validation and invalidation in accordance with an illustrative embodiment of the present disclosure can prevent further access of the corrupted information in the cache line that is caused by a bus error which occurs during a linefill operation, it also results in a considerable power saving compared with the method under prior art. Further, the disclosed method can also be applied to a non-blocking instruction or data cache arrangement which allows access to the cache memory during a linefill operation. In addition, by applying this scheme, the processor is guaranteed to be in a recoverable stage after the occurrence of a bus error; thus the Machine Check Interrupt routine does not have to invalidate the cache line or even the entire cache memory as is common practice for a data cache.

While the disclosure has been particularly shown and described with reference to an illustrative embodiment, it will be understood by those skilled in the art that various changes in form and detail may be made therein without departing from the spirit and scope of the disclosure.

What is claimed is:

1. A method of preventing information corruption in a cache memory due to a bus error which occurs during a linefill operation, said method comprising the steps of:

providing a tag in association with each cache line of said cache memory;

validating a tag associated with a particular cache line to indicate said particular cache line is valid before a linefill operation is performed to said particular cache line; and in response to an occurrence of a bus error during said linefill operation, invalidating said tag associated with said particular cache line to indicate said particular cache line is invalid, such that the integrity of information within said particular cache line is maintained.

2. The method of preventing information corruption in a cache memory due to a bus error which occurs during a linefill operation according to claim 1, wherein said validating step is performed by setting a valid bit of said cache memory to a logical "1."

3. The method of preventing information corruption in a cache memory due to a bus error which occurs during a linefill operation according to claim 1, wherein said invalidating step is performed by setting a valid bit of said cache memory to a logical "0."

4. The method of preventing information corruption in a cache memory due to a bus error which occurs during a linefill operation according to claim 1, wherein said providing a tag step further comprises the step of providing a tag from an address.

5. A cache memory having a mechanism for preventing information corruption due to a bus error which occurs during a linefill operation, said cache memory comprising:

a plurality of cache lines having a tag associated with each of said plurality of caches lines;

means for validating a tag associated with a particular cache line to indicate said particular cache line is valid before a linefill operation is performed to said particular cache line; and means for invalidating said tag associated with said particular cache line to indicate said particular cache line is invalid, in response to an occurrence of a bus error during said linefill operation.

6. The cache memory having a mechanism for preventing information corruption due to a bus error which occurs during a linefill operation according to claim 5, wherein said validating means sets a valid bit of said cache line to a logical "1" to indicate said particular cache line is valid.

7. The cache memory having a mechanism for preventing information corruption due to a bus error which occurs during a cache memory operation according to claim 5, wherein said invalidating means sets a valid bit of said cache line to a logical "0" to indicate said particular cache line is invalid.

8. The cache memory having a mechanism for preventing information corruption due to a bus error which occurs during a linefill operation according to claim 5, wherein said cache memory is a two way instruction cache.

9. A data processing system having a mechanism for preventing information corruption due to a bus error which occurs during a linefill operation, said data processing system comprising:

a processor;

a cache memory within said processor, wherein said cache memory includes a plurality of cache lines having a tag associated with each of said plurality of cache lines;

means for validating a tag associated with a particular cache line to indicate said particular cache line is valid before a linefill operation is performed to said particular cache line; and means for invalidating said tag associated with said particular cache line to indicate said particular cache line is invalid, in response to an occurrence of a bus error during said linefill operation.

10. The data processing having a mechanism for preventing information corruption due to a bus error which occurs during a linefill operation according to claim 9, wherein said validating means sets a valid bit of said cache line to a logical "1" to indicate said particular cache line is valid.

11. The data processing having a mechanism for preventing information corruption due to a bus error which occurs during a linefill operation according to claim 9, wherein said invalidating means sets a valid bit of said cache line to a logical "0" to indicate said particular cache line is invalid.

* * * * *